United States Patent

[11] 3,574,332

| [72] | Inventor | Clifford C. Wetzel |
| | | Rte 1, Ithaca, Mich. 48847 |
| [21] | Appl. No. | 831,568 |
| [22] | Filed | June 9, 1969 |
| [45] | Patented | Apr. 13, 1971 |

[54] TRAILER LIFTING AND DUMPING APPARATUS
16 Claims, 7 Drawing Figs.

[52] U.S. Cl. ..................................................... 214/49,
214/46, 214/53
[51] Int. Cl. ....................................................... B65g 67/36
[50] Field of Search ........................................... 214/47, 49,
49 (A), 53, 64.2, 314

[56] References Cited
UNITED STATES PATENTS
| 1,264,859 | 4/1918 | Richardson .................. | 214/47 |
| 2,774,493 | 12/1956 | Winter ........................ | 214/64.2X |
| 3,137,402 | 6/1964 | Gunn ........................... | 214/314 |

*Primary Examiner*—Robert G. Sheridan
*Attorney*—Learman and McCulloch

ABSTRACT: Apparatus for dumping a vehicle having a load carrying bed located at a conventional level and comprising an elongated platform on which the vehicle may be driven so as to cause the discharge end of the load carrying bed to engage an abutment having its upper surface at a level corresponding substantially to that of the load carrying bed. The platform is pivoted to rock about an axis at a level corresponding to that of the load carrying bed, thereby enabling the contents of the vehicle to be discharged onto a conveyor or the like without falling from the height at which the load carrying bed is located. The platform preferably includes a vertically adjustable gate to provide a variable size throat through which the vehicle's contents must pass, thereby affording means for regulating the rate of discharge of the vehicle's contents.

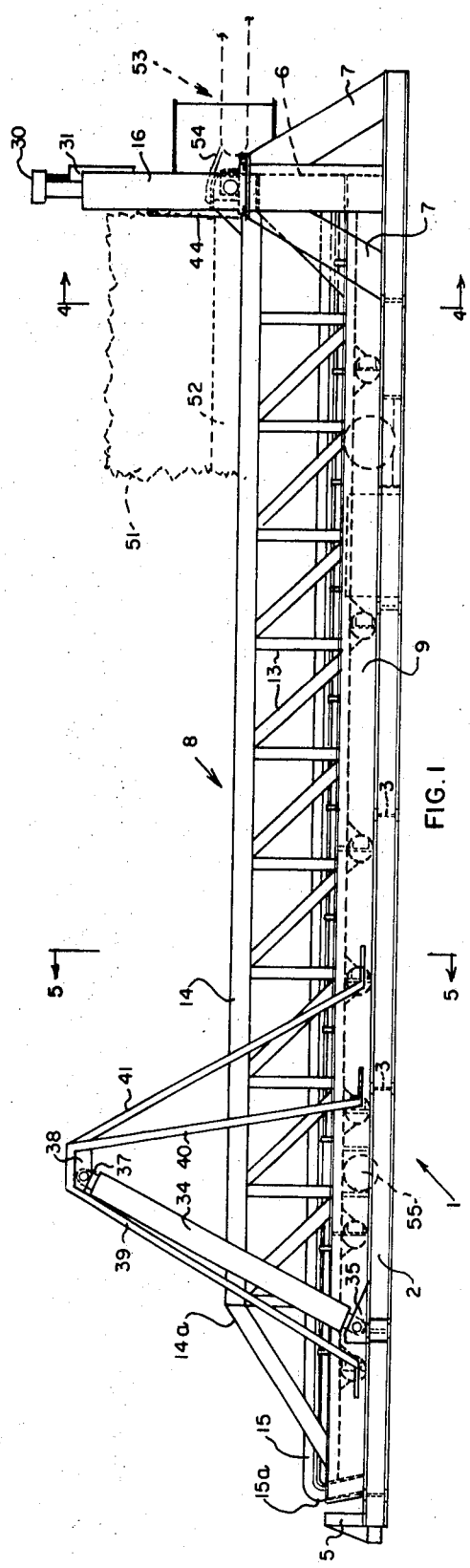

INVENTOR.
CLIFFORD C. WETZEL
BY
Learman & McCulloch

TRAILER LIFTING AND DUMPING APPARATUS

The invention disclosed herein relates to apparatus for dumping the contents of a wheeled vehicle, and more particularly to apparatus for dumping the contents of a trailer-type vehicle which normally is incapable of being elevated to dumping position.

Perishable goods such as fruits, vegetables, and the like, conventionally are transported in trailers drawn by tractors which may be disconnected from the trailers when the latter reach their destination. Such trailers have load-carrying beds which are located substantially at uniform distances above ground level so as to be capable of receiving or discharging cargo from and to loading docks, freight cars and the like. Trailers of this kind, however, normally are not equipped with means for dumping the contents. Accordingly, the contents must be discharged manually or, in some instances, apparatus is provided for tilting the trailer in such manner as to elevate its forward end, thereby permitting the contents to slide out of the trailer.

Trailer tilting mechanism currently in use are of two kinds. One kind comprises apparatus which merely rocks the trailer about the axis of the rearmost set of wheels, and the other kind is a platform on which the trailer may be accommodated and which then is tiltable about an axis located near ground level so as to effect elevation of the front end of the trailer.

There are several disadvantages to the known kinds of trailer tilting mechanisms. One of the greatest disadvantages is that the contents of the trailer must fall vertically, thereby subjecting the contents to bruises and other damage which is particularly objectionable in the case of fruits and vegetables. Another major disadvantage of known trailer tilting mechanisms is that they impose severe strains on the rear wheel mounting assemblies which the latter never were intended to withstand. Consequently, it is not uncommon for the rear wheel mounting assemblies of such a trailer to be deformed with adverse results. Still another disadvantage of known constructions is the difficulty of providing conveyors in proper locations to receive and transport articles discharged from a truck.

An object of this invention is to provide apparatus for dumping trailer and other types of vehicles and which overcomes the disadvantages of known mechanisms for similar purposes.

Another object of the invention is to provide a trailer tilting apparatus wherein the trailer automatically is supported in proper position for dumping and without the imposition of any strains on the wheel assemblies of the trailer.

A further object of the invention is to provide apparatus of the character referred to wherein free fall of the trailer's contents is precluded, thereby avoiding damaging of the trailer's contents.

Another object of the invention is to provide trailer dumping apparatus having a tiltable platform which is tiltable about an axis located at a level corresponding substantially to the level of the trailer's load-carrying bed.

A further object of the invention is to provide a tiltable platform of extremely rugged and rigid construction so as to avoid adverse deflection of the platform due to unequal loading or imperfect positioning of the trailer on the platform.

Another object of the invention is to provide means for regulating the rate of discharge of the contents of the trailer.

Other objects and advantages of the invention will be pointed out specifically or will become apparent from the following description when it is considered in conjunction with the appended claims and the accompanying drawings, in which:

FIG. 1 is a side elevational view of apparatus constructed in accordance with the invention and illustrating the tiltable platform in its lowered, horizontal position;

FIG. 2 is an isometric view, on a reduced scale, of the apparatus and illustrating the tiltable platform in an elevated position;

FIG. 6 is an enlarged, sectional view taken on the line 6—6 of FIG. 3; and

FIG. 7 is an enlarged, sectional view taken on the line 7—7 of FIG. 3.

Figure 3:
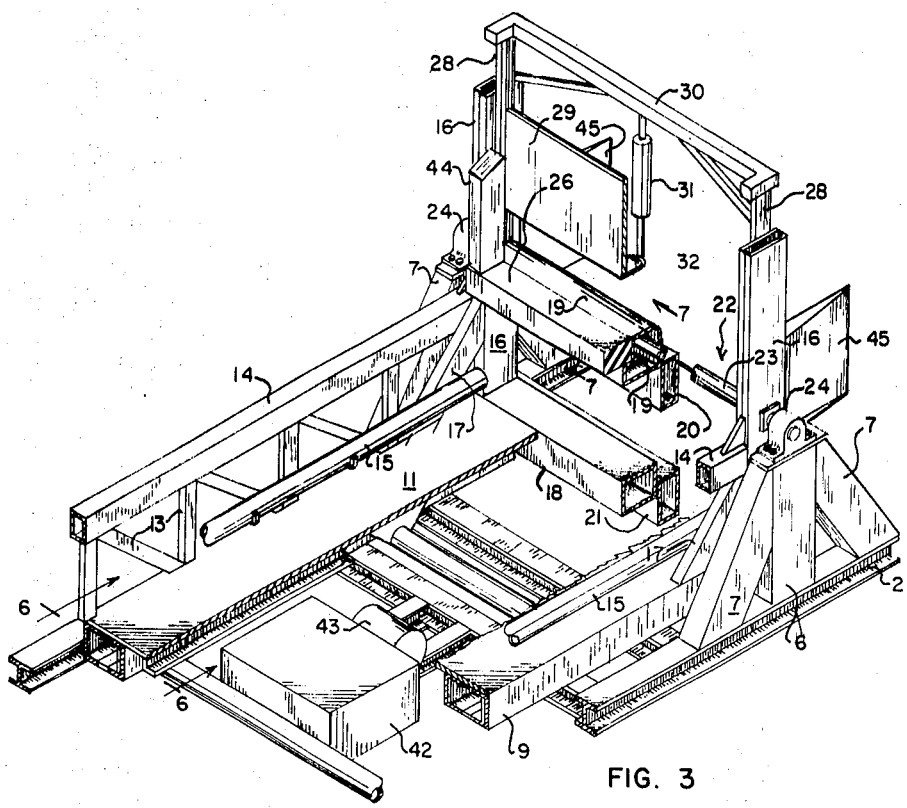
FIG. 3 is a fragmentary, isometric view illustrating the pivoted end of the platform.
Figure 5:
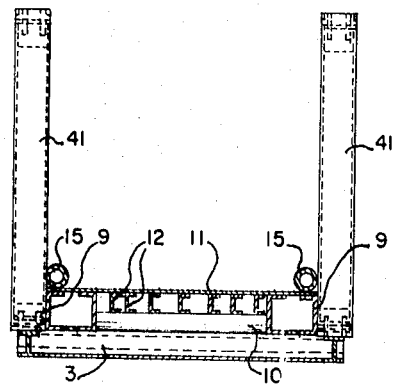
FIG. 5 is a sectional view taken on the line 5—5 of FIG. 1.
Figure 4:
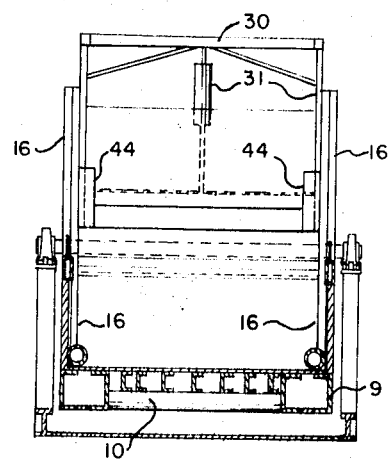
FIG. 4 is a sectional view taken on the line 4—4 of FIG. 1.

Apparatus constructed in accordance with the invention comprises a base 1 composed of parallel, longitudinal frame members 2 joined together by crossmembers 3. At the forward end of the base 1 is a massive frame member 5 which, when the base is in place, serves as a rear support for an inclined ramp (not shown) extending in prolongation and forwardly of the base. At the rear or opposite end of the base is a pair of upright supports 6 reinforced by fore and aft braces 7.

Mounted atop the base 1 is a tiltable platform or frame 8 composed of a pair of elongated, tubular, parallel girders 9 joined to one another by transverse, tubular frame members 10. Fixed to the girders 9 and spanning the width of the platform 8 is a steel deck 11. Interposed between the deck 11 and the frame members 10 is a plurality of reinforcing, longitudinally extending channel beams 12.

Secured to the girders 9 is a plurality of upstanding truss members 13 at the upper ends of which is a rail 14. The forward end of each the rails 14 is inclined downwardly as at 14a. Inwardly of each set of truss members is a tubular curb 15 which extends the full length of the platform 8. The forward ends of the curbs 15 are inclined downwardly as at 15a.

At the rear end of the platform 8 is a pair of massive upright members 16 constituting end members for the platform 8 and reinforced by braces 17. Spanning the lower ends of the uprights 16 is a beam 18, and spanning the upper ends of the uprights 16 is another beam 19. The uprights 16 and the upper beam 19 are reinforced by a brace 20 and a similar brace 21 reinforces the lower ends of the uprights 16 and the lower beam 18.

The upper member 19 is located at a level above the deck 11 which corresponds substantially to the level at which the load-carrying bed of a conventional trailer is supported above ground level. The member 19, therefore, constitutes an abutment against which the bed of a trailer may seat.

Means 22 is provided for enabling rocking movement of the platform 8 and comprises a shaft 23 that extends through the member 19, through the uprights 16, and has its end journaled in bearings 24 which are fixed atop the members 6. The axis of the shaft 23, and consequently the axis about which the platform may rock, is located substantially at the level of the abutment member 19.

The forward end of the member 19 is provided with a notch or recess 25 in which is fixed a resilient, deformable rubber or rubberlike bumper 26 which is adapted to be engaged by the rear end of the vehicle trailer for a purpose presently to be described. The upper surface of the member 19 is rounded at its rearward end, as indicated at 27, for a purpose also to be explained.

The uprights 16 carry confronting channels or tracks 28 between which is accommodated a vertically adjustable gate 29. The tracks 28 are joined at their upper ends by a frame member 30 to which is secured one end of a cylinder 31 within which is a reciprocable piston having its piston rod 32 secured to the gate 29 so as to permit vertical adjustment of the latter. The gate 29 is mounted directly above the abutment 19 so as to provide a variable size throat 29a through which articles may pass over the abutment 19.

Operating means 33 is provided for effecting rocking movements of the platform 8 about the axis of the shaft 23 and comprises a pair of cylinders 34 pivoted at their lower ends to blocks 35 mounted on their associated base frame members 2. Within each cylinder 34 is a plurality of relatively telescoping rods 36 and 37, the upper end of each rod 37 being pivoted to a bar 38 that is supported by upstanding legs 39 and 40 and reinforced by a brace 41, each of the members 39, 40 and 41 being fixed to the respective platform girders 9. The rods 36 and 37 are extensible and retractile relatively to one another and to the cylinders 34 by means of hydraulic fluid delivered to and from the cylinders 34 from a reservoir 42 via a pump 43 under the control of a valve, as is conventional. Fluid from the reservoir controls the operation of the gate 29 under the control of another conventional valve.

Functioning in conjunction with the rubberlike strip 26 to assist in controlling the passage of articles through the throat 29a between the members 19 and 29 is a pair of rubber or rubberlike deformable cushions or blocks 44 located at opposite ends of the throat 29a and supported by the uprights 16. Guide flanges 45 also are supported by the uprights 16 and project rearwardly of the throat 29a so as to channel the flow of articles following their passage through the throat.

An important characteristic of the invention resides in the construction of the platform 8 in such manner as to enable it to be sufficiently rigid to offer great resistance to forces tending to twist it. This construction is best illustrated in FIG. 6 wherein one of the two identical, tubular girder members 9 is illustrated on an enlarged scale. Each frame member 9 comprises a pair of spaced apart, confronting channel members 46 having a filler plate 47 secured to and spanning the distance between their lower flanges. The deck 11 is welded to the upper flange of each of the channel members 46, whereby each of the members 9 presents a closed, boxlike configuration. At intervals along the length of each member 9, and corresponding to the locations of the crossmembers 10, is a short channel member 48 having its flanges 49 abutting and fixed to the channel members 46 so as to reinforce the latter and prevent any tendency of the channels 46 to collapse or bow inwardly. The boxlike configuration of the members 9, coupled with the cylindrical crossmembers 10, provides a rectangular frame of seamless, tubular construction which has exceptional resistance to twisting forces.

In the operation of the apparatus, the platform 8 may be located in its lowered or horizontal position as indicated in FIG. 1 so as to enable a goods laden trailer shown in dotted lines at 51 to be backed onto the platform into such position as to cause the bed 52 of the trailer to abut the rubber bumper 26 forming part of the abutment 19. The bumper 26 assures sealing of any gap which otherwise might exist between the abutment 19 and the bed 52. The upright sides of the trailer will engage and compress the blocks 44. The rear door or gate of the trailer may be opened and the tractor then may be uncoupled from the trailer and driven off the platform. The hydraulic pump may be energized to effect extension of the rods 36 and 37 from the cylinders 34. As the rods 36 and 37 extend, the platform 8, together with the trailer, will be rocked about the axis of the shaft 23. As the platform swings upwardly, the bed of the vehicle will bear against the abutment 19 and be prevented thereby from moving rearwardly, and without imposing any unusual stresses on the rear wheel assemblies of the trailer.

As the platform 8 continues to swing upwardly, the contents of the trailer will be discharged from the bed of the trailer to and across the abutment 19 which, as has been stated hereinbefore, is substantially at the level of the bed. Consequently, goods discharged from the trailer to the abutment 19 are not required to fall the height at which the truck bed is located above ground level. The rate of flow of goods from the trailer may be regulated by adjustment of the gate 29 so as to increase or decrease the size of the throat 29a. The throat size may be increased by adjustment of the control valve in one direction, and the throat size may be reduced by adjustment of the valve in the opposite direction.

Goods discharged through the throat 29a may be delivered directly to a conveyor 53 indicated in chain lines in FIG. 1, by means of which they may be conveyed to any desired destination. The rounded rear end of the abutment 19 permits goods to move directly from the abutment to the conveyor without a fall. If desired, a rubber or rubberlike flap 54 may be secured to the forward end of the abutment 19 so as to extend rearwardly therefrom and provide a resilient bridge between the abutment and the conveyor 53 as is shown in FIG. 1.

Inasmuch as the axis about which the platform 8 rocks is located substantially at the level of the trailer bed, and inasmuch as the abutment 19 also is at the level of the trailer bed and is at the axis of rocking of the platform, the platform may be swung through its complete range of movement without necessitating any fore and aft or vertical adjustment of the conveyor 53 or other device to which goods are discharged from the trailer.

In the event the vehicle is closer to one side of the platform than to the other, or in the event that the degree of extension of the pairs of rods 36 and 37 should for some reason be unequal, the rigidity of the platform 8 will be sufficient to resist the tendency of the platform to be twisted. Thus, the apparatus is quite safe in operation.

When handling some kinds of goods, it frequently is desirable to impart some vibratory effect to the container of the goods so as to break individual articles apart for discharge. This objective may be accomplished by mounting a pneumatic air vibrator 55 on the bottom of the platform 8, the vibrator being operable from an air compressor (not shown) via a suitable valve. Alternatively, the vibrator 55 may be detachable from the platform 8 and provided with means enabling it to be detachably supported on the trailer, thereby increasing the vibration which may be imparted to the trailer.

The disclosed embodiment is representative of a presently preferred form of the invention, but is intended to be illustrative rather than definitive thereof.

I claim:

1. Apparatus for dumping the contents of a vehicle having a load-carrying bed, said apparatus comprising an elongated frame for the accommodation of said vehicle; an abutment supported by said frame adjacent one end thereof at such level as to be abutted by said bed; means mounting said one end of said frame for rocking movement about an axis located substantially at said level; and means for rocking said frame about said axis.

2. Apparatus as set forth in claim 1 wherein said abutment includes resilient, deformable means adapted to be engaged by said bed.

3. Apparatus as set forth in claim 1 including gate means substantially spanning the width of said frame, and means mounting said gate means on said frame at a level above that of said abutment to provide a throat through which articles from said bed may pass over said abutment.

4. Apparatus as set forth in claim 3 including means for varying the position of said gate means above said abutment for varying the size of said throat.

5. The apparatus set forth in claim 1 including means for vibrating said frame.

6. The apparatus set forth in claim 1 wherein said frame is composed of tubular members extending longitudinally of said frame and other tubular members extending transversely of said frame.

7. The apparatus set forth in claim 1 including yieldable, resilient cushion means at opposite ends of said abutment and extending above the level of the latter.

8. The apparatus set forth in claim 1 including a base beneath said frame and on which said frame is supported, and wherein said rocking means comprises extensible and retractile means acting between said base and said frame for imparting rocking movement to the latter.

9. Apparatus for dumping the contents of a vehicle having a load-carrying bed provided with an upper surface, said apparatus comprising a base; an elongated frame adapted to accommodate said vehicle thereon; an abutment carried by said frame adjacent one end thereof in a position to be abutted by said vehicle and having an upper surface at a level corresponding substantially to that of the upper surface of said bed; means pivotally mounting said one end of said frame on said base for rocking movement of said frame about an axis substantially at the level of said upper surface of said abutment; and means for rocking said frame about said axis from a substantially horizontal position to a raised portion in which the other end of said frame is at a level above that of said axis, whereby the contents of said vehicle may be discharged by gravity across said upper surface of said abutment.

10. Apparatus as set forth in claim 9 wherein said abutment includes resilient, deformable means adapted to be engaged by said bed.

11. Apparatus as set forth in claim 9 including gate means substantially spanning the width of said frame, and means mounting said gate means on said frame at a level above that of said abutment to provide a throat through which articles from said bed may pass over said abutment.

12. Apparatus as set forth in claim 11 including means for varying the position of said gate means above said abutment for varying the size of said throat.

13. The apparatus set forth in claim 9 including means for vibrating said frame.

14. The apparatus set forth in claim 9 wherein said frame is composed of tubular members extending longitudinally of said frame and other tubular members extending transversely of said frame.

15. The apparatus set forth in claim 9 including yieldable, resilient cushion means at opposite ends of said abutment and extending above the level of the latter.

16. The apparatus set forth in claim 9 including a base beneath said frame and on which said frame is supported, and wherein said rocking means comprises extensible and retractile means acting between said base and said frame for imparting rocking movement to the latter.